(No Model.) 3 Sheets—Sheet 1.

O. C. PUDAN.
FLUID METER.

No. 461,619. Patented Oct. 20, 1891.

Witnesses:
J. N. Cooley
W. J. Myers

Inventor:
Oliver C. Pudan
By James I. Kay
Attorney (No Model.) 3 Sheets—Sheet 2.

O. C. PUDAN.
FLUID METER.

No. 461,619. Patented Oct. 20, 1891.

Witnesses:
J. N. Cooke
W. J. Myers

Inventor
Oliver C. Pudan
By James D. Kay
Attorney (No Model.) 3 Sheets—Sheet 3.
O. C. PUDAN.
FLUID METER.
No. 461,619. Patented Oct. 20, 1891.
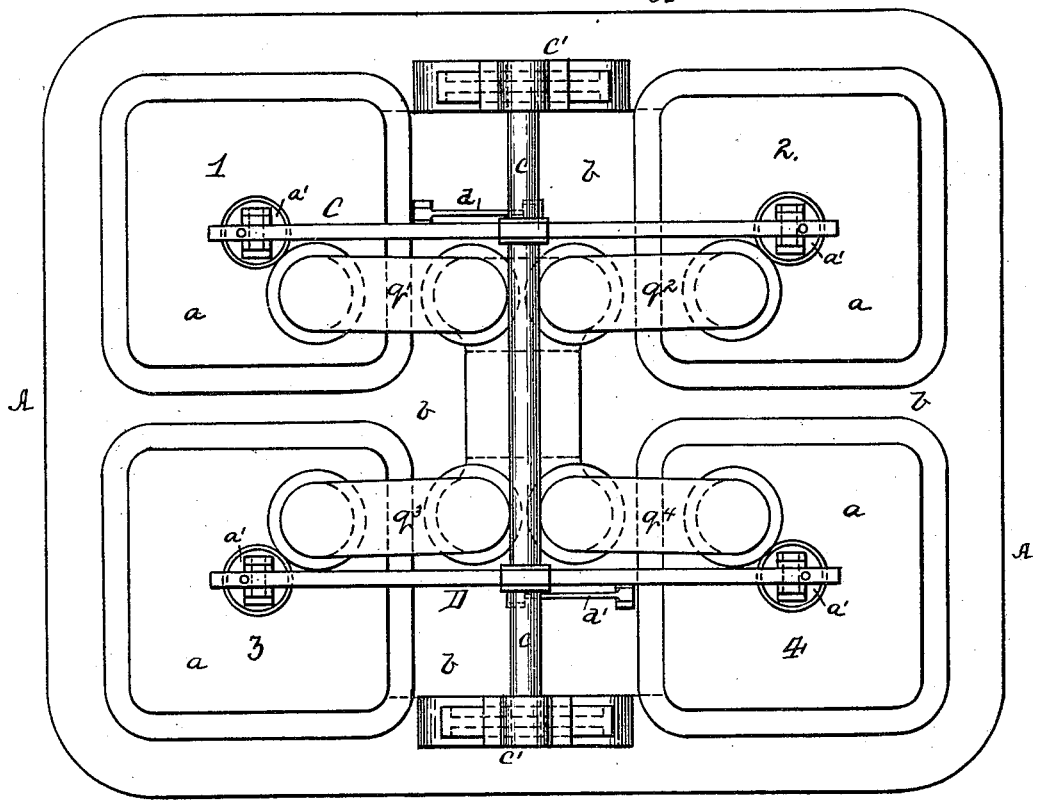
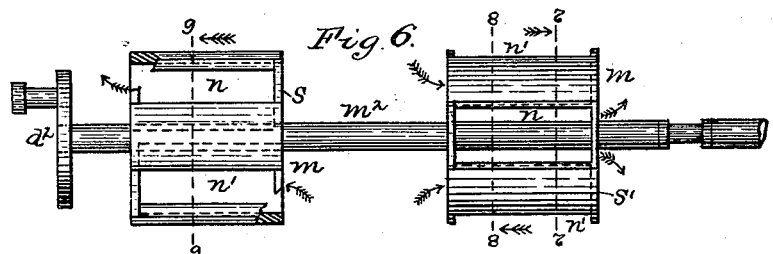
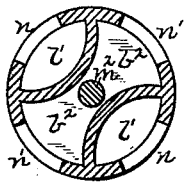
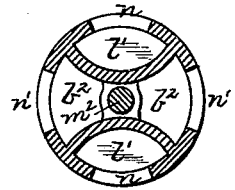
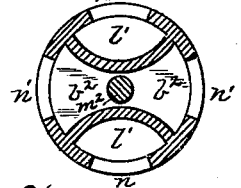
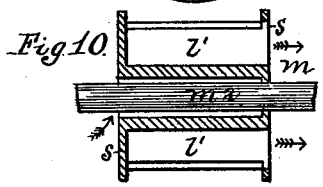
Witnesses:
J. N. Cooke
[signature]
Inventor:
Oliver C. Pudan
By James I. Kay
Attorney

UNITED STATES PATENT OFFICE.

OLIVER C. PUDAN, OF PITTSBURG, PENNSYLVANIA, ASSIGNOR OF ONE-HALF TO GEORGE W. SIMONDS, OF SAME PLACE.

FLUID-METER.

SPECIFICATION forming part of Letters Patent No. 461,619, dated October 20, 1891.

Application filed June 2, 1890. Serial No. 353,983. (No model.)

*To all whom it may concern:*

Be it known that I, OLIVER C. PUDAN, a resident of Pittsburg, in the county of Allegheny and State of Pennsylvania, have invented a new and useful Improvement in Fluid-Meters; and I do hereby declare the following to be a full, clear, and exact description thereof.

My invention relates to fluid-meters for measuring gas, air, steam, or liquids, its object being to provide what might be termed a "reciprocating-piston meter," in which the sealing of the piston or measuring-holder is obtained wholly by means of the sealing-fluid, so that practically all friction between the parts of the meter is overcome and a perfect sealing and accurate measurement of the fluid are obtained.

My invention relates to certain improvements in the arrangements of the inverted-cup pistons within their cylinders, the arrangement of the several cylinders, and the operation of the valve mechanism, as will be hereinafter set forth and claimed.

To enable others skilled in the art to make and use my invention, I will describe the same more fully, referring to the accompanying drawings, in which—

Figure 1:
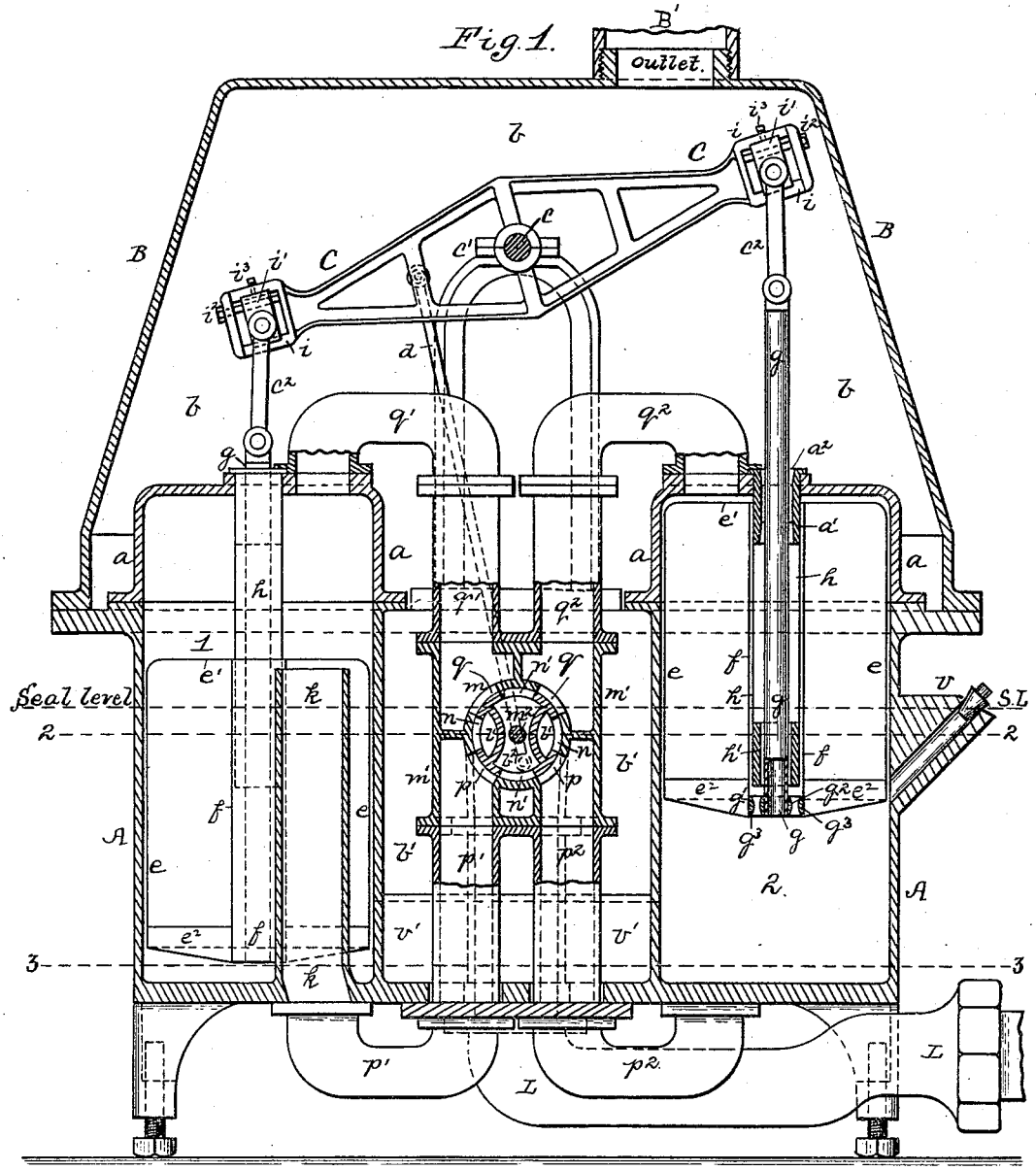
Figure 5:
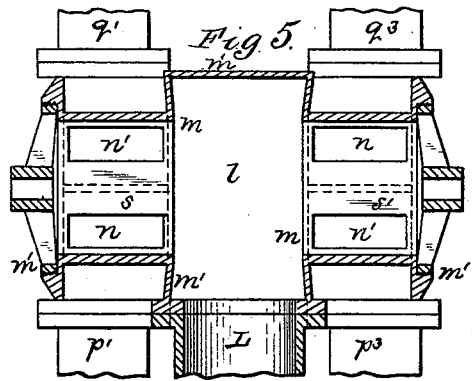
Figure 2:
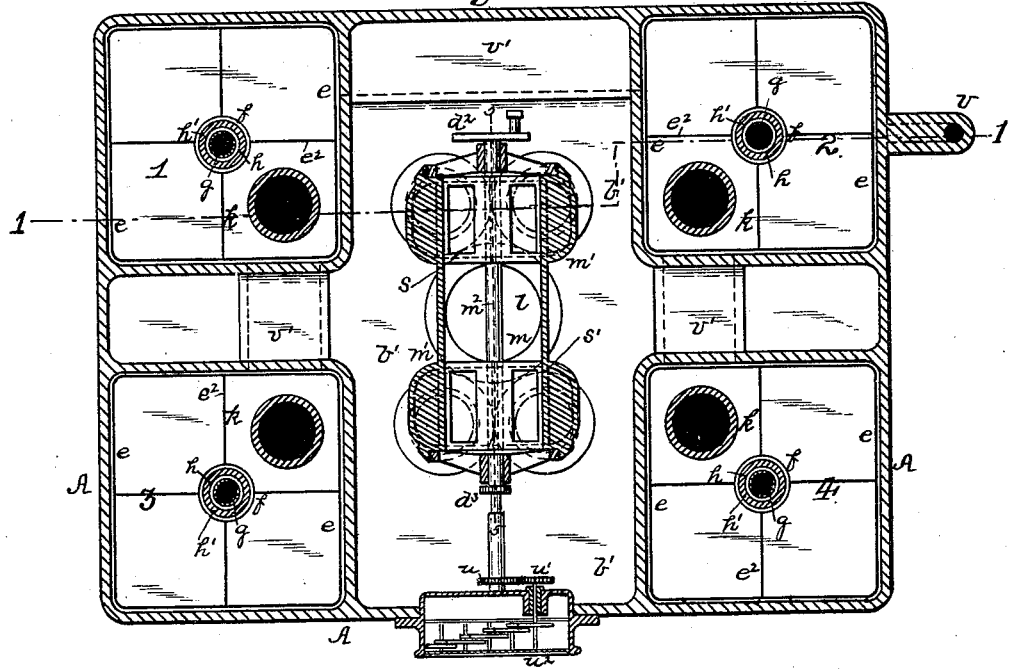
Figure 3:
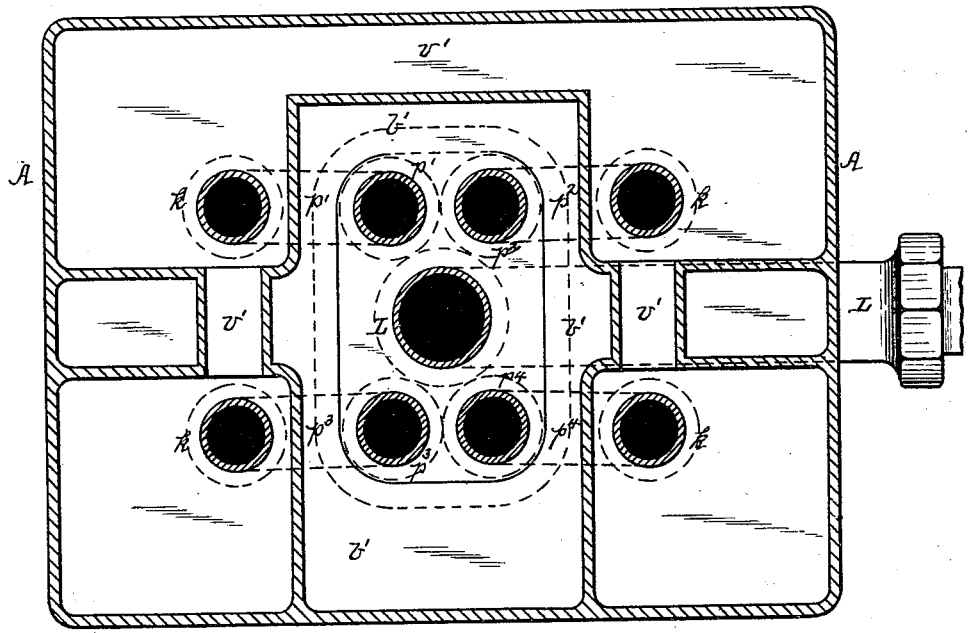
Figure 11:
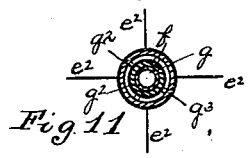

Figure 1 is a sectional view on the line 1 1, Fig. 2. Fig. 2 is a cross-section on the line 2 2, Fig. 1. Fig. 3 is a cross-section on the line 3 3, Fig. 1. Fig. 4 is a top view, the cover of the meter being removed. Fig. 5 is a detail cross-section of the valve-casing and pipes leading therefrom on the line 5 5, Fig. 2. Fig. 6 is a side view of the valve mechanism removed from its case. Figs. 7, 8, and 9 are cross-sections looking at the valves on the lines 7 7, 8 8, 9 9, respectively. Fig. 10 is a longitudinal section of one of the valves, and Fig. 11 is a detail section of the skeleton coupling.

Like letters of reference indicate like parts in each.

The meter embodying my invention may be employed with gas, air, steam, or any liquids, though it will be particularly described in connection with gas, it being understood that the sealing-fluid and position of the meter may be changed, according to the fluid to be measured.

The body of the meter is cast to shape, it being formed of the main body A and the cover B, resting thereon, the cover inclosing the working beams C D and forming the discharge-chamber $b$ of the meter, this chamber, however, extending down within the main body A, as shown at $b'$, the valve apparatus being located in the chamber $b'$, so that the gas measured will pass from the valve directly into said chamber.

The main body A has formed therein the four cylinders or inclosing cases 1 2 3 4, which may be circular, square, or of other shape in cross-section, the upper ends of which are formed of the caps or heads $a$, within which cases the pistons or inverted measuring-cups $e$ reciprocate. These cups $e$ are formed of sheet metal and correspond in shape to the inclosing cases, within which they fit, fitting loosely therein, so as to reciprocate within the cylinders without frictional contact with the sides thereof. The cups are inverted, having the closed upper ends $e'$, and, when in their highest position within the cylinders, extend down for about one-third of their length below the sealing-liquid within the cylinders, said sealing-liquid being maintained therein at about the dotted line marked "seal-level" and the inverted cups being sealed by the liquid within the case.

In order to impart the necessary reciprocating motion to the cups $e$, I form through the same a central passage by means of the sheet-metal tube $f$, open at both ends, the piston-rod $g$ extending through the cylinder-head $a$ and passing through said tube $f$ and engaging with the lower end of the inverted cup and its central tube by a skeleton coupling $g'$, the skeleton coupling $g'$ being shown in Fig. 11, and being formed of two rings $g^2 g^3$, connected by ribs, the piston-rod $g$ being connected to the ring $g^2$, while the tube $f$ is connected to the ring $g^3$, the measuring-cup $e$ having also the braces $e^2$ extending over from the lower edges of the cup to said skeleton coupling $g'$, these braces being formed of sheet metal, so as to offer practically no obstruction to the movement of the cup within the liquid. The faces of the skeleton coupling $g'$ are also made inclined or curved, as shown, so that said coupling offers practically no resistance to the movement of the piston within the liquid.

The piston $g$ passes through the tubular fitting $a'$ in the cylinder-head $a$, this fitting acting simply as a guiding means and not fitting closely around the piston-rod, and depending from the fitting and extending down into the sealing-liquid is the tube $h$, which fits between the piston-rod $g$ and the tube $f$ of the inverted-cup piston, and acts as a seal between the upper part of the cylinder and the piston-rod. This tube $h$, as will be seen, extends almost down to the fitting $g'$ when the inverted-cup piston is in its raised position, and in order to prevent the creation of pressure or vacuum between the piston-rod and said tube $h$ when the piston is raised or lowered, I form in the fitting $a'$ passages $a^2$, communicating with the measuring-gas chamber $b$. I generally form in the lower end of the tube $h$ a guiding-fitting $h'$, surrounding the piston and bearing slightly on the same, said fitting, however, having passages therein to permit the passage of the sealing-liquid through the same. This guiding-fitting also serves further to prevent the liquid within the tube from ebullition by the reciprocation of the piston-rod, as it checks the flow into or out of the tube which would be caused by the movement of the rod or of the skeleton fitting connecting it to the cup-piston. At the same time the opening at the top of the tube permits the gas to enter from the measured-gas space and maintain the equilibrium within the tube.

In order to form a passage for the gas into each inverted-cup piston, I provide within each cylinder or casing a tube $k$, which extends from the lower end of the cylinder up above the seal-level of the liquid and enters within the inverted cup, as shown, so as to feed the gas to said inverted cup and withdraw it therefrom as the piston is raised or lowered, this tube $k$ communicating with a passage in the lower end of the cylinder, with which a suitable pipe communicates, as hereinafter described. This tube $k$ passes up at one side of the cylinder and between two of the braces $e^2$ at the base of the cup-piston, as shown, so that it does not interfere with the movement of the piston.

The improvements above described may of course be employed with any suitable form of piston meter and valve apparatus; but I prefer to employ them with the construction of meter illustrated in the drawings, which will be hereinafter more fully described. In said apparatus the pistons of the cylinders 1 2 are connected to the working beam C, while the pistons of the cylinders 3 4 are connected to the working beam D, said beams C and D being mounted on a shaft $c$, supported in bearings $c'$, inclosed within the cover B and within the space $b$ for the measured gas. Each beam is connected to the piston-rods by means of pitmen $c^2$. To provide means for adjusting the longitudinal movement of the pistons within their cylinders, and consequently for adjusting the amount of gas measured thereby, I form the slides $i$ at the ends of the working beams, in which I mount the boxes $i'$, to which the pitmen $c^2$ are journaled. A screw-rod $i^2$ is mounted in the slide $i$ and engages with a threaded portion of the box $i'$, so that the box may be moved longitudinally in its slide and the pivotal point of the pitman, and through it the stroke of the piston be accurately regulated. The box $i'$ can be locked in its slide by the set-screw $i^3$. A pipe L, entering centrally within the body A of the meter, passes up within the space $b'$ thereof to the valve-casing $m'$, this valve-casing extending horizontally through the space $b'$ and the valve $m$ therein being operated by the rods $d$ $d'$, connected to the working beams C D and to the cranks $d^2$ $d^3$, respectively, of the valve-shaft $m^2$, so that as the beams rise and fall, through said rods and the cranks, the valve is turned within its casing, the cranks $d^2$ $d^3$ being placed at such angle to each other as to insure the continual rotation of the valve when gas is passing through the meter and to prevent any dead-point in the movement thereof.

The valve shown is a rotary valve mounted in the casing $m'$, which casing is formed at the upper end of the inlet-pipe L, and the gas from said inlet-pipe enters the inlet-space $l$ of the valve-casing. The pipes leading to the several measuring-cases are arranged at the side of the inlet-pipe, there being four of these pipes leading to the lower ends of the measuring-cylinders and communicating with the pipes $k$ within said cylinders, and four of such pipes leading to the upper ends of said cylinders and communicating with the space above the cup-pistons therein. The pipes leading to the lower ends of the cylinders are marked $p'$ $p^2$ $p^3$ $p^4$, according to the particular cylinder with which they communicate, and the pipes leading to the upper ends of said cylinder are marked $q'$ $q^2$ $q^3$ $q^4$, according to the cylinders with which they communicate. The pipes $p'$ $p^2$ $p^3$ $p^4$ communicate with ports $p$ in the valve-casing $m'$, and the pipes $q'$ $q^2$ $q^3$ $q^4$ communicate with the ports $q$ in said valve-casing.

The valve $m$ has in each side of the inlet-space $l$ therein a cylindrical box fitting in the casing and having ports corresponding to the ports $p$ and the ports $q$. These valve-boxes $s$ $s'$ are provided with the two inner passages $l'$, communicating with the inlet-space $l$, and two outer passages $b^2$, communicating with the measured-gas chamber $b$. In the construction shown the inner passages $l'$ are open at their inner ends, so as to communicate with the supply-inlet $l$, and the central passage forms the outer passage $b^2$ of the valve, being open at its outer end so as to communicate with the space $b$ of the case. The passages $l'$ have ports $n$, formed in the walls thereof, so that the gas can pass from the inlet $l$ through said ports or passages to the several pipes leading to the measuring-cylinders, while the passage $b^2$ has the ports $n'$ formed in the wall thereof, so that the gas measured can pass from the several cylinders into the passage $b^2$ and thence into the space for measured gas. It will thus be seen that during the rotation of the valve, when it is supplying gas through its ports to the pipes leading to two of the cylinders, it is permitting the escape of gas from the pipes leading from the other cylinders, and means are thus provided for the feeding of the gas to the cylinders to be measured and the passage of the gas from said cylinders after it is measured.

It will be seen that the cylindrical boxes $s$ $s'$ of the valve, though similar in construction, are set at an angle of forty-five degrees to each other on the valve-shaft $m^2$, so that when the one valve is brought into such position as to receive gas from and feed it to the cylinders the ports $p$ and $q$ controlled by the other valve are closed, its ports passing between the ports $p$ $q$ leading to those cylinders, so that in the numerous cylinders of the meter the gas is being fed to and discharged from two such cylinders below and above the piston during the passage of the valve-ports between the ports leading to the other cylinders, so that there is a practically continuous flow of gas at all times, two of the cylinders receiving the gas and discharging the same, and through the connecting-rod $d$ acting to rotate the valve $m$, and as soon as the valve opens communication with the other cylinders the pressure therein through the other connecting-rod $d'$ continues the rotation of the valve, so opening and closing the valves, and according to the pressure and the amount of gas withdrawn measuring the gas and maintaining an even pressure of the gas in the space $b$ holding the measured gas.

The registering apparatus employed is the same as usually employed in such meters, the valve-shaft $m^2$, extending out at one side and carrying a pinion $u$, which engages with a pinion $u'$, connected to the series of gearing carrying the dial-hands in the dial-face $u^2$ of the meter. In order to feed the liquid employed as a seal to the several cylinders, I employ the pouring-spout $v$, and to maintain said liquid at the proper height within all of the cylinders the said cylinders 1 2 3 4 have communicating passages $v'$ between them, these passages being located in the lower part of the body A and communicating with the bases of the cylinders.

The operation of the meter as above described is as follows: The gas enters through the inlet-pipe L and the measured gas passes out from the chamber $b$ through the outlet B'. As the gas is withdrawn from the meter it reduces the pressure on the discharge side thereof, a difference in pressure of, say, a fraction of an ounce being thus created. This permits the gas to flow from some one of the measuring-cylinders into the space $b$, in which case there is created a difference in pressure on one or the other side of one or more of the cup-shaped pistons. For instance, suppose that the inlet-pipe L communicates with the interior of the piston $e$ in the cylinder $l$ through the pipes $p'$ and $k$ and the upper end of said cylinder communicates through the pipe $q'$ with the space $b$. On account of this difference of pressure the gas would then raise the piston $e$ in said cylinder $l$, and at the same time the opposite movement would be taking place, say, in the cylinder 2, the gas entering from the inlet-pipe L through the pipe $q^2$ above the piston and being discharged through the pipe $k$ and pipe $p^2$. This would cause the movement of the working beam C, and when said chambers were filled and emptied the closing of the pipes or passages $p'$ $p^2$ $q'$ $q^2$ thereof, and at the same time, through the movement of the valve, the opening of the pipes $p^3$ $p^4$ $q^3$ $q^4$ of the other cylinders 3 4. The gas entering said cylinders will then cause the raising and lowering of the respective pistons therein, and in like manner the measuring of the gas within said cylinders, the operation being continuous according to the amount of gas consumed. During this operation each inverted-cup piston moves within its cylinder with practically no friction, as it is in contact with no part of the cylinder, the seal being maintained by the liquid in the lower part of the cylinder. At the same time there is no friction upon the piston-rod, as it is sealed at its lower end by the liquid within the cylinder, and in case of suction in the space between the piston-rod and the stationary pipe $h$ depending from the upper end of the cylinder the gas can enter said space from the chamber $b$, through the passage $a^2$ in the fitting $a'$. A perfect fluid seal is thus obtained in each cylinder and one which will preclude the leakage or escape of any gas, since there are no moving parts which are not perfectly sealed by the fluid within the cylinder, and at the same time there is practically no friction of the moving parts within the cylinder. The several cylinders thus act to measure the gas either above the cup-shaped piston and between the same and the cylinder-heads or within said cup-shaped pistons in the space between the same and the fluid forming the seal, an accurate measurement of the gas being thus obtained, and the mechanism being so evenly balanced as to be affected by a very slight difference of pressure; while as the gas is measured on both sides of the piston the meter will act to measure a large quantity of gas, and is at the same time compact, and, being formed of few parts, is durable and not liable to get out of order. The liquid employed as a seal within the meter is preferably an oil which will act to lubricate the parts and prevent rust thereof, such oils being well known in the art.

What I claim as my invention, and desire to secure by Letters Patent, is—

1. In meters, the combination of the cylinder, the cup-shaped piston $e$, having the tube $f$ extending down from its closed end, the piston-rod $g$, extending through the tube and connected by a skeleton frame to the piston, and the tube $h$, extending down from the cylinder-head between the rod $g$ and tube $f$, and having the bushing $h'$, substantially as and for the purposes set forth.

2. In meters, the combination of the cylinder, the cup-shaped piston $e$ and having the tube $f$ extending from its closed end, the piston-rod $g$, extending through said tube, the skeleton frame $g'$, having the rings $g^2$ $g^3$ connected to the piston-rod and tube, and the arms $e^2$, connecting the ends of the cup to the said skeleton frame, substantially as and for the purposes set forth.

3. In meters, the combination of a cylinder, a cup-shaped piston reciprocating in the cylinder and having a tube extending down from its closed end, said tube being open at both ends, the piston-rod extending through said tube and connected to the base of the tube, a stationary tube depending from the cylinder-head around the piston-rod, and passages communicating with the measured-gas chamber and the space between said stationary tube and the piston-rod, substantially as and for the purposes set forth.

4. In meters, the combination of a series of cylinders, each having a cup-shaped piston therein, piston-rods extending through the top walls of the cylinders and connected to said cups within the cylinders and to working beams above the same, pipes leading to the measuring-cylinders, a valve controlling the flow through said pipes, and connections from said working beams to the controlling-valve, substantially as and for the purposes set forth.

5. In meters, the combination of the body A, having the cylinders 1 2 3 4, having cup-shaped pistons therein, pipes leading to said several cylinders, a valve controlling the flow of gas from the inlet-passage and to the exhaust-chamber through said pipes, and an inclosing cover secured to the case and forming the chamber for the measured fluid, substantially as and for the purposes set forth.

6. In meters, the combination of the cylinders 1 2 3 4, having cup-shaped pistons therein, the piston-rods connected thereto and to working beams above the cylinders, pipes leading to the upper ends of the cylinders, pipes leading to the lower ends of the cylinders and passing up within the cup-pistons, and valve mechanism controlling the flow of gas through said pipes to the spaces above and within said several cup-pistons, substantially as and for the purposes set forth.

7. A meter having a series of separate measuring-cylinders provided with cup-shaped pistons sealed therein by sealing-liquid and having passages connecting the bases of the several cylinders for the purpose of maintaining the sealing-liquid at the same height in the several cylinders, and an entrance for sealing-liquid communicating with one of said cylinders, substantially as and for the purposes set forth.

In testimony whereof I, the said OLIVER C. PUDAN, have hereunto set my hand.

OLIVER C. PUDAN.

Witnesses:
JAMES I. KAY,
J. N. COOKE.